(12) United States Patent
Bloch et al.

(10) Patent No.: US 8,860,882 B2
(45) Date of Patent: Oct. 14, 2014

(54) SYSTEMS AND METHODS FOR CONSTRUCTING MULTIMEDIA CONTENT MODULES

(71) Applicant: JBF Interlude 2009 Ltd—Israel, Tel Aviv (IL)

(72) Inventors: Jonathan Bloch, Brooklyn, NY (US); Barak Feldman, Tenafly, NJ (US); Tal Zubalsky, Tel Aviv (IL); Kfir Y. Rotbard, Ramat Hasharon (IL)

(73) Assignee: JBF Interlude 2009 Ltd—Israel (IL)

( * ) Notice: Subject to any disclaimer, the term of this patent is extended or adjusted under 35 U.S.C. 154(b) by 21 days.

(21) Appl. No.: 13/622,780

(22) Filed: Sep. 19, 2012

(65) Prior Publication Data

US 2014/0078397 A1    Mar. 20, 2014

(51) Int. Cl.
*H04N 9/475*    (2006.01)
(52) U.S. Cl.
USPC ........... 348/512; 348/500; 348/513; 348/515; 348/516; 348/563; 348/564; 348/565; 348/569; 348/456; 348/461; 348/462; 348/464; 348/492; 725/29; 725/104; 725/105; 725/109; 725/110; 725/112; 725/135; 715/201; 715/202; 715/233; 386/200; 386/201; 386/241; 386/243
(58) Field of Classification Search
USPC ......... 348/512, 500, 513, 515, 516, 563, 564, 348/565, 569, 456, 461, 462, 464, 492; 725/29, 104, 105, 109, 110, 112, 135; 386/200, 201, 241, 243; 715/201, 202, 715/233
See application file for complete search history.

(56) References Cited

U.S. PATENT DOCUMENTS

| | | | |
|---|---|---|---|
| 5,568,602 | A | 10/1996 | Callahan et al. |
| 5,607,356 | A | 3/1997 | Schwartz |
| 5,636,036 | A | 6/1997 | Ashbey |
| 5,734,862 | A | 3/1998 | Kulas |
| 6,122,668 | A | 9/2000 | Teng et al. |
| 6,222,925 | B1 | 4/2001 | Shiels et al. |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

An ffmpeg and SDL Tutorial, "Tutorial 05: Synching Video," Retrieved from internet on Mar. 15, 2013: <http://dranqer.com/ffmpeg/tutorial05.html>, (4 pages).

(Continued)

*Primary Examiner* — Jefferey Harold
*Assistant Examiner* — Mustafizur Rahman
(74) *Attorney, Agent, or Firm* — Goodwin Procter LLP

(57) ABSTRACT

A system for constructing seamlessly viewable multimedia content from selectably presentable multimedia content blocks includes a block definition module for facilitating creation and modification of the content blocks. The block definition module includes a media assignment submodule for associating a synchronized audio and video segment with a content block. Also included is a block linking submodule for creating seamless connections between content blocks, whereby a transition between the connected blocks occurs substantially without interruption upon viewing the multimedia content. The block definition module further includes a layer submodule for associating an interactive layer having interactive controls with the content block.

26 Claims, 8 Drawing Sheets

(56) References Cited

U.S. PATENT DOCUMENTS

| | | | |
|---|---|---|---|
| 6,298,482 B1 | 10/2001 | Seidman et al. | |
| 7,379,653 B2 | 5/2008 | Yap et al. | |
| 7,917,505 B2* | 3/2011 | van Gent et al. | 707/732 |
| 1,012,610 A1 | 5/2011 | Ben Shaul at al. | |
| 8,065,710 B2* | 11/2011 | Malik | 725/109 |
| 2002/0091455 A1 | 7/2002 | Williams | |
| 2002/0120456 A1 | 8/2002 | Berg et al. | |
| 2002/0177914 A1 | 11/2002 | Chase | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2006/0064733 A1 | 3/2006 | Norton et al. | |
| 2006/0150072 A1 | 7/2006 | Salvucci | |
| 2006/0224260 A1 | 10/2006 | Hicken et al. | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0239754 A1 | 10/2007 | Schnitman | |
| 2008/0022320 A1* | 1/2008 | Ver Steeg | 725/78 |
| 2008/0086754 A1* | 4/2008 | Chen et al. | 725/105 |
| 2008/0091721 A1 | 4/2008 | Harboe et al. | |
| 2008/0092159 A1 | 4/2008 | Dmitriev et al. | |
| 2008/0276157 A1* | 11/2008 | Kustka et al. | 715/201 |
| 2008/0300967 A1 | 12/2008 | Buckley et al. | |
| 2008/0314232 A1 | 12/2008 | Hansson et al. | |
| 2009/0199697 A1 | 8/2009 | Lehtiniemi et al. | |
| 2009/0228572 A1 | 9/2009 | Wall et al. | |
| 2009/0320075 A1 | 12/2009 | Marko | |
| 2010/0077290 A1* | 3/2010 | Pueyo | 715/230 |
| 2010/0153512 A1* | 6/2010 | Balassanian et al. | 709/208 |
| 2010/0167816 A1 | 7/2010 | Perlman et al. | |
| 2010/0186579 A1 | 7/2010 | Schnitman | |
| 2010/0262336 A1* | 10/2010 | Rivas et al. | 701/36 |
| 2010/0268361 A1 | 10/2010 | Mantel et al. | |
| 2010/0332404 A1 | 12/2010 | Valin | |
| 2011/0007797 A1 | 1/2011 | Palmer et al. | |
| 2011/0010742 A1* | 1/2011 | White | 725/53 |
| 2011/0026898 A1 | 2/2011 | Lussier et al. | |
| 2011/0131493 A1 | 6/2011 | Dahl | |
| 2011/0138331 A1 | 6/2011 | Pugsley et al. | |
| 2012/0005287 A1* | 1/2012 | Gadel et al. | 709/206 |
| 2012/0094768 A1 | 4/2012 | McCaddon et al. | |
| 2012/0198412 A1 | 8/2012 | Creighton et al. | |
| 2012/0308206 A1 | 12/2012 | Kulas | |
| 2013/0046847 A1* | 2/2013 | Zavesky et al. | 709/217 |

FOREIGN PATENT DOCUMENTS

| | | |
|---|---|---|
| EP | 2104105 A1 | 9/2009 |
| GB | 2359916 A | 9/2001 |
| GB | 2428329 A | 1/2007 |
| WO | WO-00/59224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/057444 A2 | 5/2008 |
| WO | WO-2008052009 A2 | 5/2008 |
| WO | WO-2009/137919 A1 | 11/2009 |

OTHER PUBLICATIONS

Archos Gen 5 English User Manual Version 3.0, Jul. 26, 2007, pp. 1-81.

International Search Report for International Patent Application PCT/IL2012/000080 dated Aug. 9, 2012 (4 pages).

International Search Report for International Patent Application PCT/IL2012/000081 dated Jun. 28, 2012 (4 pages).

International Search Report for International Patent Application PCT/IL2010/000362 dated Aug. 25, 2010 (2 pages).

Supplemental European Search Report for EP10774637.2 (PCT/IL2010/000362) mailed Jun. 20, 2012 (6 pages).

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).

Yang, H, et al., "Time Stamp Synchronization in Video Systems," Teletronics Technology Corporation, <http://www.ttcdas.com/products/daus encoders/pdf/ tech papers/tp 2010 time stamp video system.pdf>, Abstract, (8 pages).

* cited by examiner

*Project mode*

*Segment mode*

SYSTEMS AND METHODS FOR CONSTRUCTING MULTIMEDIA CONTENT MODULES

FIELD OF THE INVENTION

The invention relates generally to structuring multimedia content, and more particularly to systems and methods for constructing seamlessly viewable multimedia content from selectably presentable multimedia content blocks.

BACKGROUND

With the continued growth of the Internet and the World Wide Web, streaming media has become ubiquitous. Users frequently listen to streaming music on Internet radio stations such as Pandora, and watch streaming television shows, movies, and video clips on websites such as Hulu, Netflix, and YouTube. Interactive streaming multimedia content, though less common, is also available. Current forms of interactive videos allow a viewer to make choices on how to proceed through predefined video paths; however, this functionality is accomplished using separate video segments that are jumped to upon selection, resulting in a noticeable disconnect in audio and video between consecutive segments.

Accordingly, there is a need for systems and methods for constructing multimedia content having seamless transitions between individual segments.

SUMMARY OF THE INVENTION

In one aspect, a system for constructing seamlessly viewable multimedia content from selectably presentable multimedia content blocks includes a block definition module for facilitating the creation and modification of the content blocks. The block definition module includes a media assignment submodule for associating synchronized video and audio segments with the content blocks. A block linking submodule is included for creating seamless connections between content blocks, such that transitions between connected blocks occur substantially without interruption upon viewing the multimedia content. The block definition module further includes a layer submodule for adding interactive layers with interactive controls to content blocks.

In some embodiments, the seamless connections include incoming connections to previous content blocks and/or outgoing connections to selectable content blocks. The connected blocks make up media content paths that can be viewed as seamless video streams.

In another embodiment, the interactive layer includes option selection controls for selecting outgoing content blocks to be seamlessly presented directly following the current content block. The interactive layer may include a timer display indicating the time remaining for a viewer to select the next content block to view. The option selection controls may be displayed during a non-looping portion of the audio and video segment. In one embodiment, the interactive layer is superimposed on and synchronized with the video.

In yet another embodiment, the block definition module further includes a statistics collector submodule for defining viewer actions that may be tracked. The viewer actions may include whether a viewer makes a selection, and if so, which video segment was selected. The viewer actions may also include the time elapsed prior to the viewer making a selection In some embodiments, the viewer actions include input device actions taken by the viewer during the selection time, such as cursor movements. In some embodiments, the viewer actions may also include functions related to social media applications such as Twitter, Facebook, general email applications, and others. These functions may include posting, sharing, liking or otherwise distributing the video with others.

The system may further include a builder module for facilitating assembly of the content blocks into an interconnected structure, such that the blocks are seamlessly viewable via a content player as selectable multimedia content paths. The interconnected structure may be represented as a node graph, in which each content block is a node in the graph and is connected to at least one other content block, each connection representing a seamless viewing transition between the connected blocks.

In another aspect, a method for constructing seamlessly viewable multimedia content from selectably presentable multimedia content blocks includes facilitating the creation and modification of the content blocks, associating synchronized video and audio segments with the content blocks, creating one or more seamless connections between content blocks such that transitions between connected blocks occur substantially without interruption upon viewing the multimedia content, and associating interactive layers with interactive controls with the content blocks.

In some embodiments, the seamless connections include incoming connections to previous content blocks and/or outgoing connections to selectable content blocks. The connected blocks make up media content paths that can be viewed as seamless video streams.

In another embodiment, the interactive layer includes option selection controls for selecting outgoing content blocks to be seamlessly presented directly following the current content block. The interactive layer may include a timer display indicating the time remaining for a viewer to select the next content block to view. The option selection controls may be displayed during a non-looping portion of the audio and video segment. In one embodiment, the interactive layer is superimposed on and synchronized with the video.

In yet another embodiment, the method further includes defining viewer actions that may be tracked. The viewer actions may include whether a viewer makes a selection, and if so, which video segment was selected. The viewer actions may also include the time elapsed prior to the viewer making a selection In some embodiments, the viewer actions include input device actions taken by the viewer during the selection time, such as cursor movements. The viewer actions may also relate to social media applications such as Twitter, Facebook, general email applications, and others. These functions may include posting, sharing, liking or otherwise distributing the video with others.

The method may further include facilitating assembly of the content blocks into an interconnected structure, such that the blocks are seamlessly viewable via a content player as selectable multimedia content paths. The interconnected structure may be represented as a node graph, in which each content block is a node in the graph and is connected to at least one other content block, each connection representing a seamless viewing transition between the connected blocks.

Other aspects and advantages of the invention will become apparent from the following drawings, detailed description, and claims, all of which illustrate the principles of the invention, by way of example only

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein in various embodiments, the invention provides a media content modeling and authoring tool and software module structure and methods for its use that serves as a building block unit for the assembly of selectably presentable video segments into seamlessly presented video, such as that described in U.S. patent application Ser. No. 13/033,916, entitled "System and Method for Seamless Multimedia Assembly," and filed Feb. 24, 2011, the entirety of which is hereby incorporated by reference. Selectably presentable video content may include, for example, one or more separate video content paths and/or segments that are seamlessly presented to a viewer as a continuous video. In some instances, the viewer is permitted to make choices at one or more various decision points interspersed throughout the video content, resulting in the corresponding video segment(s) and/or path(s) associated with the choices to be presented to the viewer.

Although the invention is primarily described herein with respect to streaming audio and video, the invention is applicable to streaming and non-streaming media, including animation, video games, interactive media, and other forms of content usable in conjunction with the present systems and methods. Streaming media may include, for example, multimedia content that is continuously presented to a viewer while it is received from a content delivery source, such as a remote video server.

Seamless video content may be constructed from individual, multimedia content building blocks, hereinafter referred to as Interlude Single Modules (ISMs). Each ISM may include video, audio and interactive elements. A specialized media player may be used to read the ISMs, connect them seamlessly in real time according to viewer choices, and present the created video to the viewer in a continuous, substantially uninterrupted form, such that there are no noticeable gaps or jumps in audio, video, and/or other content between ISMs.

Figure 1:
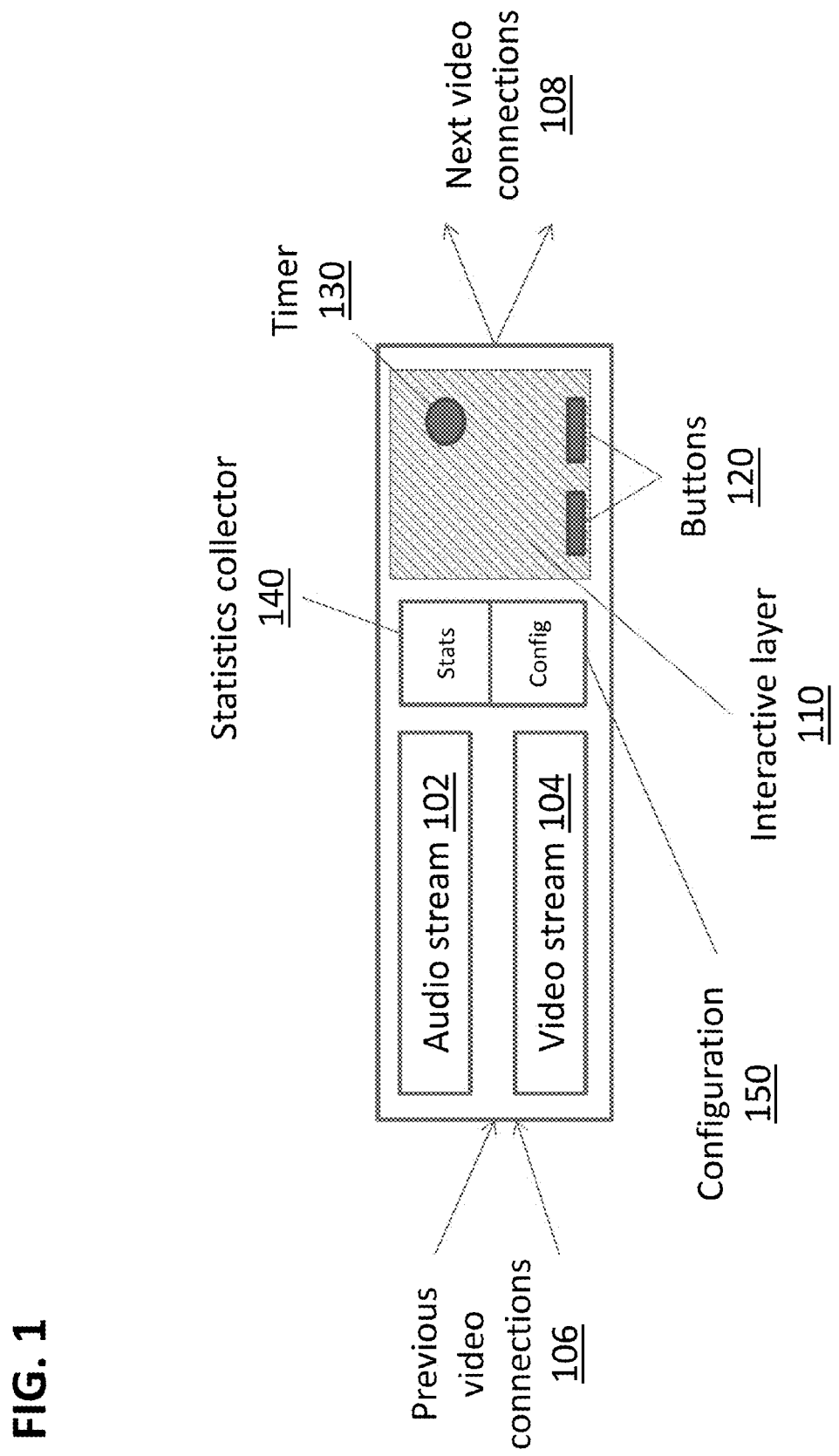
FIG. 1 is a diagram of an exemplary media content building block module according to an embodiment of the invention.

In one embodiment, an ISM is a modularized building block that represents the smallest unit of the seamless video content described herein. As illustrated in FIG. 1, an ISM may include an audio stream 102 and a video stream 104, each synchronized to the other such that at any point in the playback of the streams, the audio correctly lines up with the video. In some embodiments, other streams are included in the ISM, such as images or text (e.g., subtitles). Each stream may be in synchronization with another stream, a subset of streams, or no streams. When synchronized, streams may have substantially the same play length. Audio, video, and other streams may be separate, or they may be combined in a single multimedia stream.

Each ISM may include at least one connection to another ISM. When two ISMs are linked together and rendered or displayed by a supported media player, they appear as single, continuous media content. In other words, the audio, video and/or other media stream transition from one ISM to another appear to be seamless to the viewer such that the viewer cannot detectably identify the connection points among the ISMs. ISMs may have one or more incoming connections 106 and/or one or more outgoing connections 108. If a single ISM has more than one incoming connection 106 (i.e., there are multiple ISMs directly previous to the ISM), then during playback of the video content, those multiple incoming paths converge at the single ISM. In this instance, the ends of the media streams of the multiple ISM seamlessly transition into the beginning of the media stream of the single ISM. If a single ISM has more than one outgoing connection 108 (i.e., there are multiple ISMs directly following the ISM), then during playback of the video content, a viewer has the option of selecting a particular video segment (associated with a corresponding ISM) to be presented. Again, the transition between the single ISM and the selected ISM occurs without noticeable interruption to the viewer.

In some instances, an ISM has one or more outgoing connections and no incoming connections. This configuration may exist for ISMs that are positioned at the start of a media content path (i.e., the ISM is the first ISM (or one of multiple first ISMs)) that is processed by a media player during content playback. Likewise, an ISM may have one or more incoming connection and no outgoing connections. This particular configuration relates to an ISM that terminates a media content path (i.e., the ISM is the last ISM (or one of multiple last ISMs)) that is processed by a media player during content playback. In some configurations, ISMs can be connected to start pages and/or end pages. For example, a viewer may first browse to a starting webpage from which the first ISM content may be launched. Similarly, the final ISM in a content path may be directed to an ending webpage, such that the viewer is directed to the page after the streaming media completes.

The ISM may include an interactive content layer 110 which allows custom controls, text, graphics, timers, and/or other indicators or interactive elements to be associated with the multimedia content in the ISM. The elements may be associated with individual ISMs, or, in some cases, with the compilation of multiple, connected ISMs. Elements present on the interactive content layer may be positioned, for example, on video content, a media player, or in other suitable locations. In one embodiment, the interactive layer 110 is superimposed on the video such that the interactive elements are opaque or partially transparent, but the remainder of the layer is completely transparent, allowing the video to be viewed otherwise unobstructed. The interactive layer 110 may be dimensioned equally to the video, or may occupy only a portion thereof. The interactive layer may appear immediately upon playback of the media content associated with an ISM, and/or it may appear after a fixed, variable, or random delay.

In some embodiments, the interactive layer 110 includes button controls 120 and/or a timer 130. One skilled in the art will appreciate the various graphical and textual forms that interactive controls, timers, and other elements may take, such as buttons, switches, dials, sliders, spinners, menus, progress bars, dialogs, popups, tabs, links, ribbons, graphical overlays, and the like. The elements on the interactive layer 110 may be any size or color, and may be positioned anywhere on or around the video display. The elements may be icons, pictures, animations, and/or videos. Text entered by a viewer may appear on the interactive layer 110 with various modifications and/or graphical effects. Elements may be rotoscoped onto the video, composited with the video using green screen or other techniques, superimposed, or otherwise overlaid on the video and may include visual effects such as shadowing, embossing, highlighting, distortion, and any other desirable effects.

In some embodiments, some elements on the interactive layer 110 may be hidden but active, such that a viewer cannot see the elements but may interact with them. In other implementations, some elements may be passive, meaning that a viewer is unable to interact with the elements. Passive buttons may be displayed that allow a viewer to see what video path options are available and/or what path options are automatically selected for the viewer. Passive elements may be hidden or visible to the viewer.

Buttons 120 (or other suitable controls) may allow a viewer to select an option during video playback that corresponds to a path to be followed. For example, an automobile advertisement video may allow a viewer to select which car he or she would like to test drive. To allow the viewer to make this choice, two labeled buttons (e.g., "Sporty" and "Simple") may appear on the interactive layer of the video while it is playing. In some embodiments, the viewer is given a fixed period of time to make a selection (e.g., three seconds, five seconds, or any appropriate length of time), and if no option is chosen, the video proceeds with an option selected automatically, allowing a smooth audio/video transition between segments (i.e., between ISMs). Upon the viewer making a selection, the transition to the corresponding video segment (ISM) may occur immediately, or the segment may be allowed to finish or reach a certain point such that the audio/video transition between the segments (ISMs) is seamless. In the above example, if the viewer selects "Sporty," the media player may effect a seamless transition from the currently playing ISM to the ISM associated with a sports car test drive video and display the content associated with that segment accordingly.

The timer 130 on the interactive layer 110 may be used to display the remaining amount of time that a viewer has to select a video path to follow (i.e., what ISM to transition to). The timer 130 may be represented as a clock, a bar, and/or any suitable textual and/or graphical representation of time. The timer 130 may toggle between a visible and hidden display, which may be invoked automatically and/or by viewer interaction.

Referring back to the above car example, the viewer may be given ten seconds to choose between a sporty and a simple vehicle. This countdown may begin before the video segment ends or while the segment (or a portion thereof) continues in a loop. In addition to the countdown indicator, the timer may display the length of time until the next ISM will begin playing, whether or not the viewer has selected an option. This next-segment timer may be displayed in combination with the selection countdown timer and/or it may replace the countdown timer after an option is selected.

In some embodiments, ISMs include statistics collectors to gather information about viewer interaction with that ISM and/or adjoining ISMs during playback. Statistics may be gathered from a single viewer or multiple viewers and may be aggregated and sent to a database for further analysis and retrieval. Collected statistics may include whether a viewer selected an option; which option, if any, was selected; the amount of the time the viewer took to select the option; the segment previous to the current segment; keys pressed or cursor movement during the selection period and/or during other portions of the playback; and/or the length of the segment (which may be combined with other selected segments to determine the total length of the followed video content path by the viewer). The viewer actions may also include functions related to social media applications such as Twitter, Facebook, general email applications, and others. These functions may include posting, sharing, liking or otherwise distributing the video with others. The statistics associated with the ISM may further include those described in U.S. patent application Ser. No. 13/034,645, entitled "System and Method for Data Mining within Interactive Multimedia," and filed Feb. 24, 2011, the entirety of which is hereby incorporated by reference.

The collected statistics may be utilized for various means; for example, they may be aggregated to determine popular viewer selections based on plays of particular video segments by the viewer, the viewer's friends, social networking connections, and/or all other users. The statistics may be dynamically updated as viewers watch videos and make choices, and may be displayed in real time on or around the video, for example, on the interactive layer. For example, if each viewer in a group of Facebook friends separately watches a particular video at the same time, each may see various statistical indicators on the interactive layer update in real-time as his or her friends make selections on which video content paths to follow. This statistical indicator may also appear in a simplified form; for example, the button associated with the most popular selection may be highlighted or include a visual effect suitable to indicate its popularity.

ISMs may further include configuration information 150 associated with the particular ISM. Such information may include, but is not limited to: (1) a unique identifier; (2) name; (3) video length; (4) audio length; (5) video format; (6) audio format; (7) video resolution; (8) time before interactive layer appearance; (9) option selection time limit; and/or (10) whether statistics are collected for the ISM.

In one embodiment, a content modeling and authoring tool is used to create ISMs and assemble them into seamless, selectably presentable audio and video content. This media building tool may be used by various media creators, such as directors, artists, ad agencies, production agencies, and other parties to create and edit the selectable media building blocks and combine them into any desirable structure. The tool may be a hosted, web-based application or a standalone application that may be locally installed.

Figure 2:
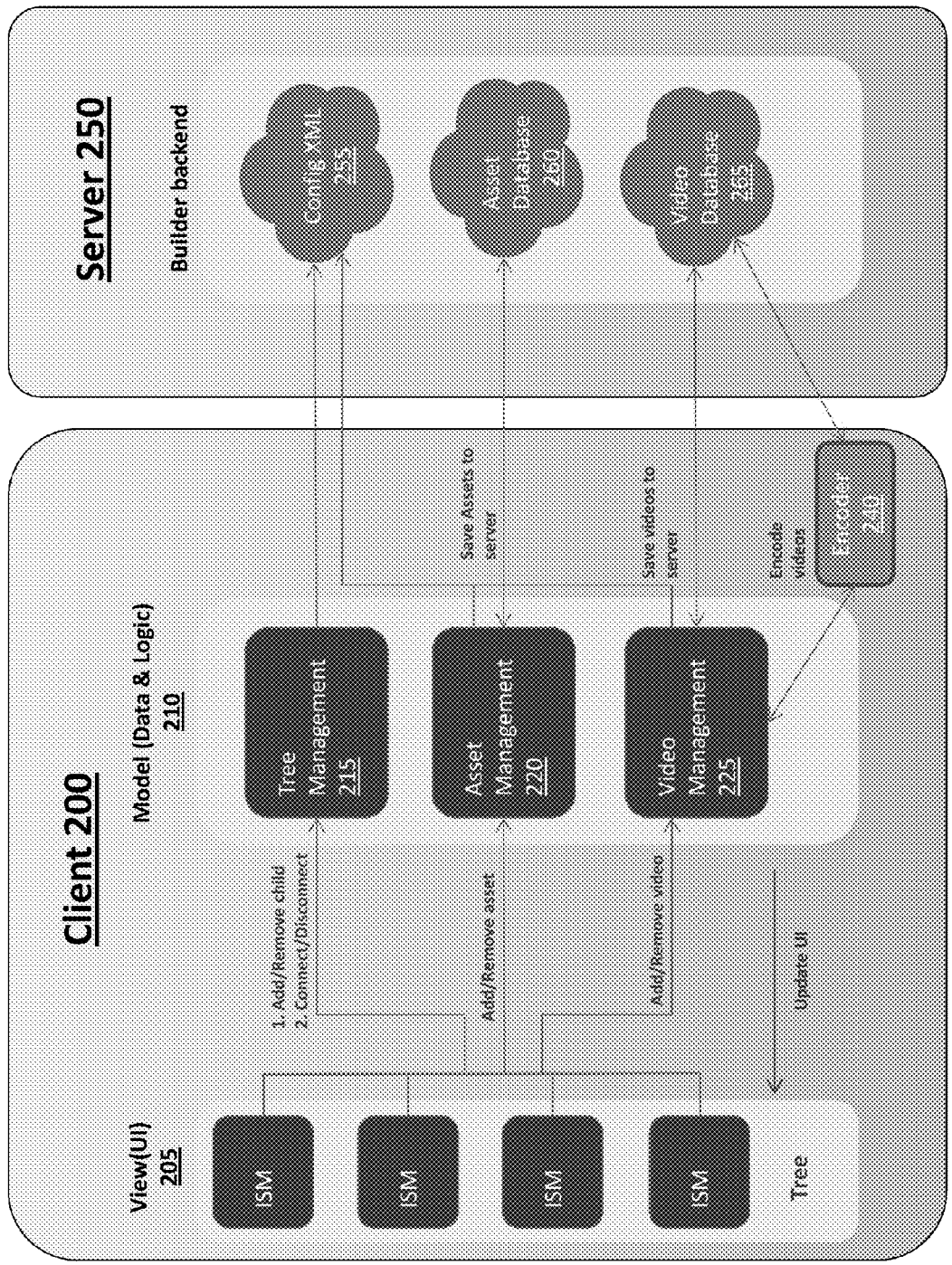
FIG. 2 is an architecture diagram of an exemplary media content builder tool according to an embodiment of the invention.

Referring to FIG. 2, the tool may be a remotely-hosted application with user interaction occurring through client-side functionality. The client 200 may include a web-based user interface 205 (view layer) accessible via a standard web browser. The user interface 205 may be programmed using any suitable form of scripting language (e.g., JavaScript, Python, Perl, etc.), and/or may require a browser plugin for operation (e.g., Java, Flash, Silverlight, etc.). The interface 205 may allow a user to manipulate data associated with an ISM, as well as to arrange ISMs into any suitable media path structure, such as a tree, for seamless playback.

The model layer 210 of the of the building tool may exist server-side, or on the client, as depicted. The model layer 210 is responsible for path structure management 215, ISM asset management 220, and video (and other media) management 225. Upon modifying the path structure through the user interface 205, the corresponding data model is updated by the path structure management module 215. For example, with a tree structure, the model may be updated to add and/or remove child nodes. Likewise, the addition of new ISM or media assets, or changes made to existing assets may result in the asset management module 220 and video management module 225 updating the respective data structures associated therewith.

The management modules 215, 220, 225 may communicate with server 250 to update the various path structure models and asset data structures. The path structure and/or ISM configuration data may be stored on the server 250 as an XML file 255 or other suitable text-based or binary file. ISM assets, video, audio, and other assets, may be tracked and/or stored in asset database 260 and/or video database 265 on the server 250. Media content may be encoded, compressed, or otherwise modified by an encoder 240 when transferred between the client 200 and server 250. The encoder 240 may convert the audio, video, and/or other media streams into a format that enables the streams to be connected seamlessly to each other.

It is to be appreciated that the described architecture of the media builder tool is merely an exemplary embodiment. One skilled in the art will appreciate the various manners in which the tool may be implemented and still accomplish the functionality described herein. For example, various modules and databases may be distributed between the client and server differently than described. There may be multiple clients and servers, or the application may operate on a single system. Accordingly, the invention encompasses the various embodiments accessible to those having ordinary skill in the art.

Figure 3:
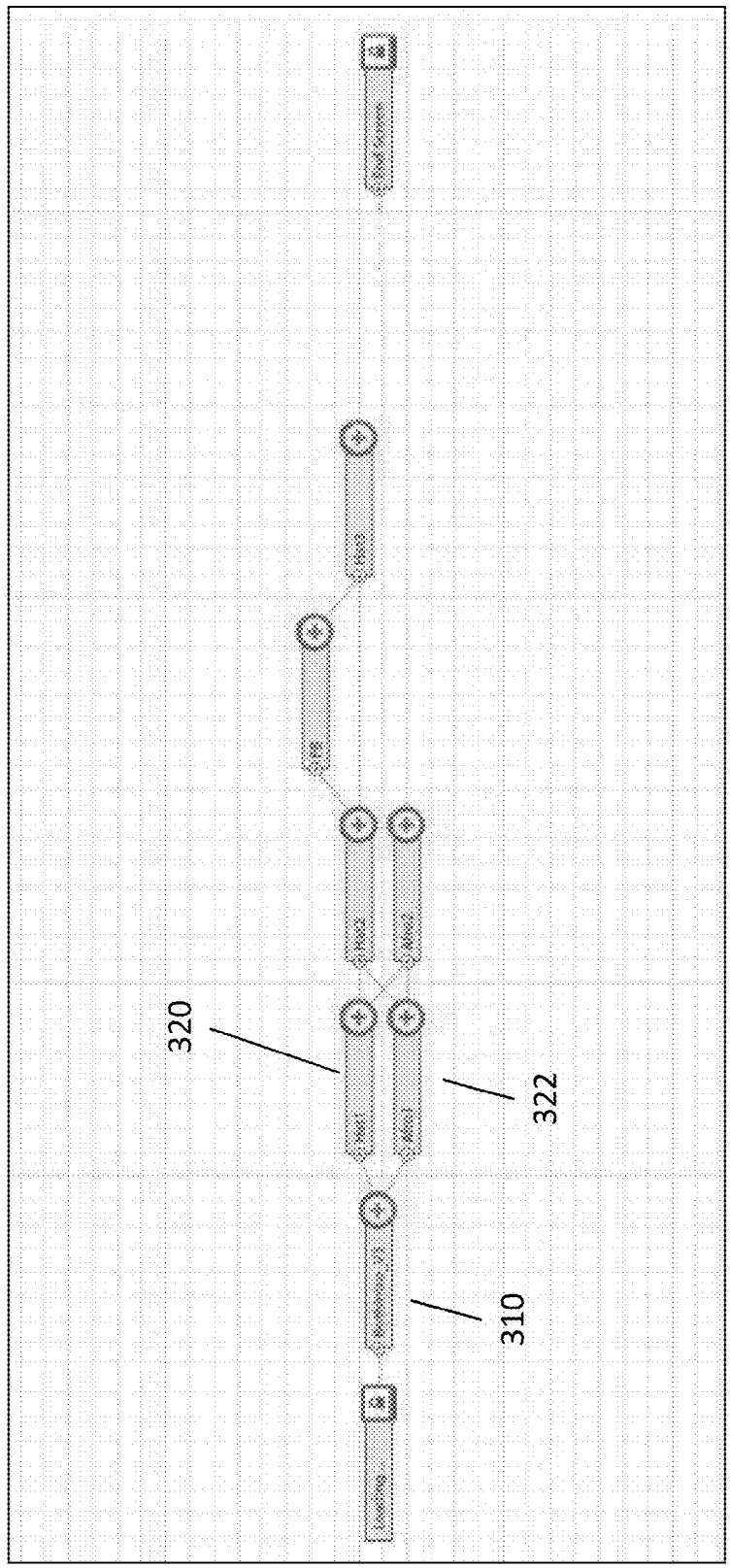
FIG. 3 is an exemplary user interface for assembling media content according to an embodiment of the invention.

In some embodiments, the builder tool includes two primary modes. Referring to FIG. 3, a user may work in Project Mode, which includes an interface for facilitating the assembly of ISMs into media content path structures. As described above, ISMs that are connected together form a seamless transition for video, audio, and/or other media content associated with the ISMs. In the depicted example, a user has created a path structure including several selectably presentable media content blocks. ISM 310 includes two outgoing connections to ISMs 320 and 322. Accordingly, when the video represented by this structure is played, a viewer will be presented with two selectable options at a point in time during the playback of the multimedia content associated with ISM 310. If the viewer selects the option associated with ISM 320, the continuously playing video will seamlessly transition to the video associated with that ISM 320. Similarly, if the user selects the alternative option, the video associated with ISM 322 will instead be played.

In Project Mode, a user may create a new ISM; select one or more ISMs; copy, paste, cut, move, delete, and/or rename one or more ISMs; connect and disconnect ISMs to and from each other; create new projects; save, import, and export projects; and enter Segment Mode (described below) for an ISM. The user may interact with the application in Project Mode (or any other mode) using any suitable input device, such as a keyboard and/or mouse. The application may include hotkeys for common functions and click-and-drag functionality to move ISMs around the project screen.

Figure 4A:
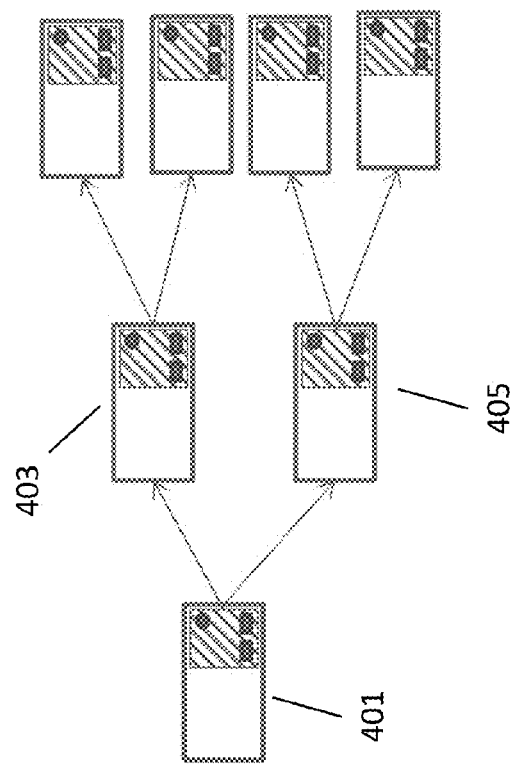
FIGS. 4A-4D are exemplary media content path structures according to an embodiment of the invention.
Figure 4B:
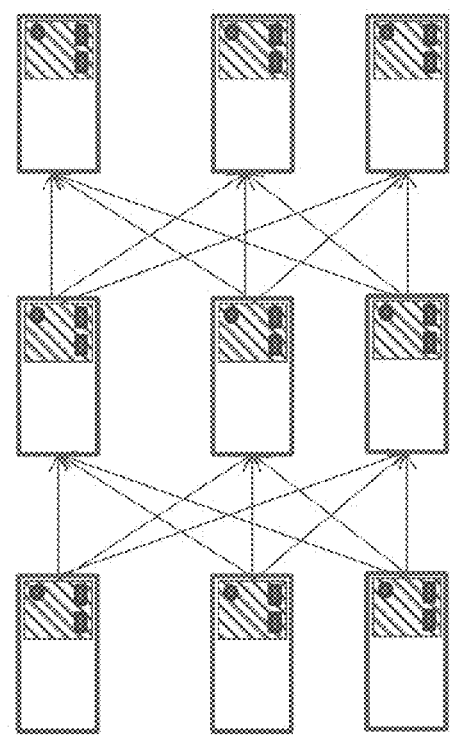
Figure 4C:
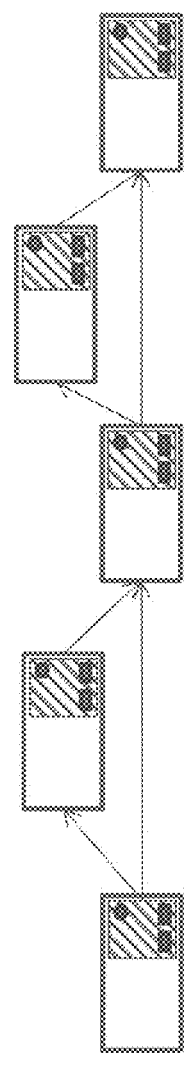
Figure 4D:
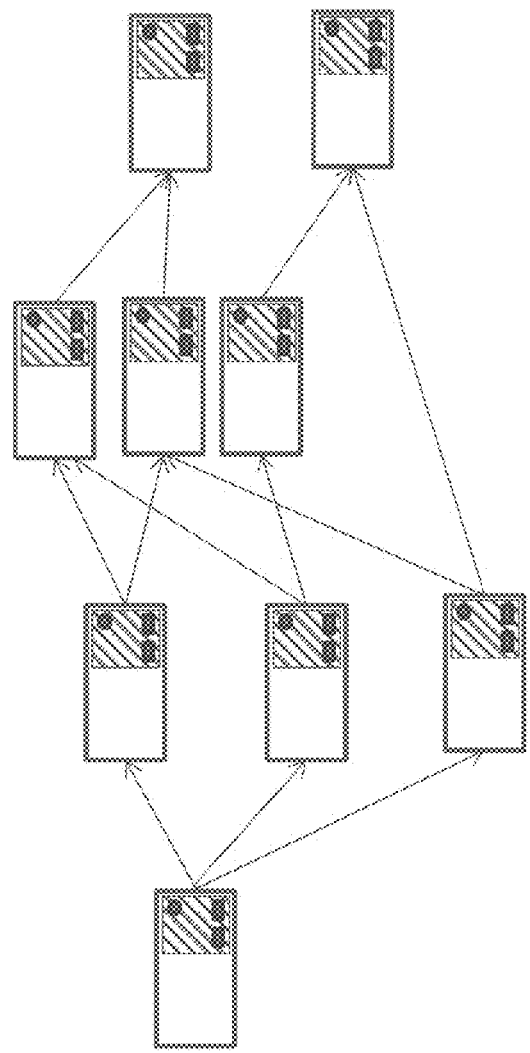

FIGS. 4A-4D illustrate various exemplary forms of path structures that may be built in Project Mode. FIG. 4A represents a video that includes four possible video paths that a viewer may follow. After the content associated with ISM 401 is played, a viewer may be presented with two options (ISMs 403 and 405) for continuing on a seamless video path. After making a selection (or having a selection made automatically), the viewer will be against be presented with two potential video segments, with each ending the video path. The structures depicted in FIGS. 4B-4D operate similarly, with seamless transitions occurring in the directions of the arrows. As illustrated, there may be multiple starting and/or ending points, multiple incoming and/or outgoing connections, and/or paths with more or less ISMs than other paths. One skilled in the art will appreciate that the tree structures described and depicted herein are merely exemplary embodiments, and any suitable structure may be used to build the branching media content. Such structures may include, but are not limited to, graphs, lists, flowcharts, hierarchical structures, state diagrams, and/or any combination of the foregoing.

Figure 5:
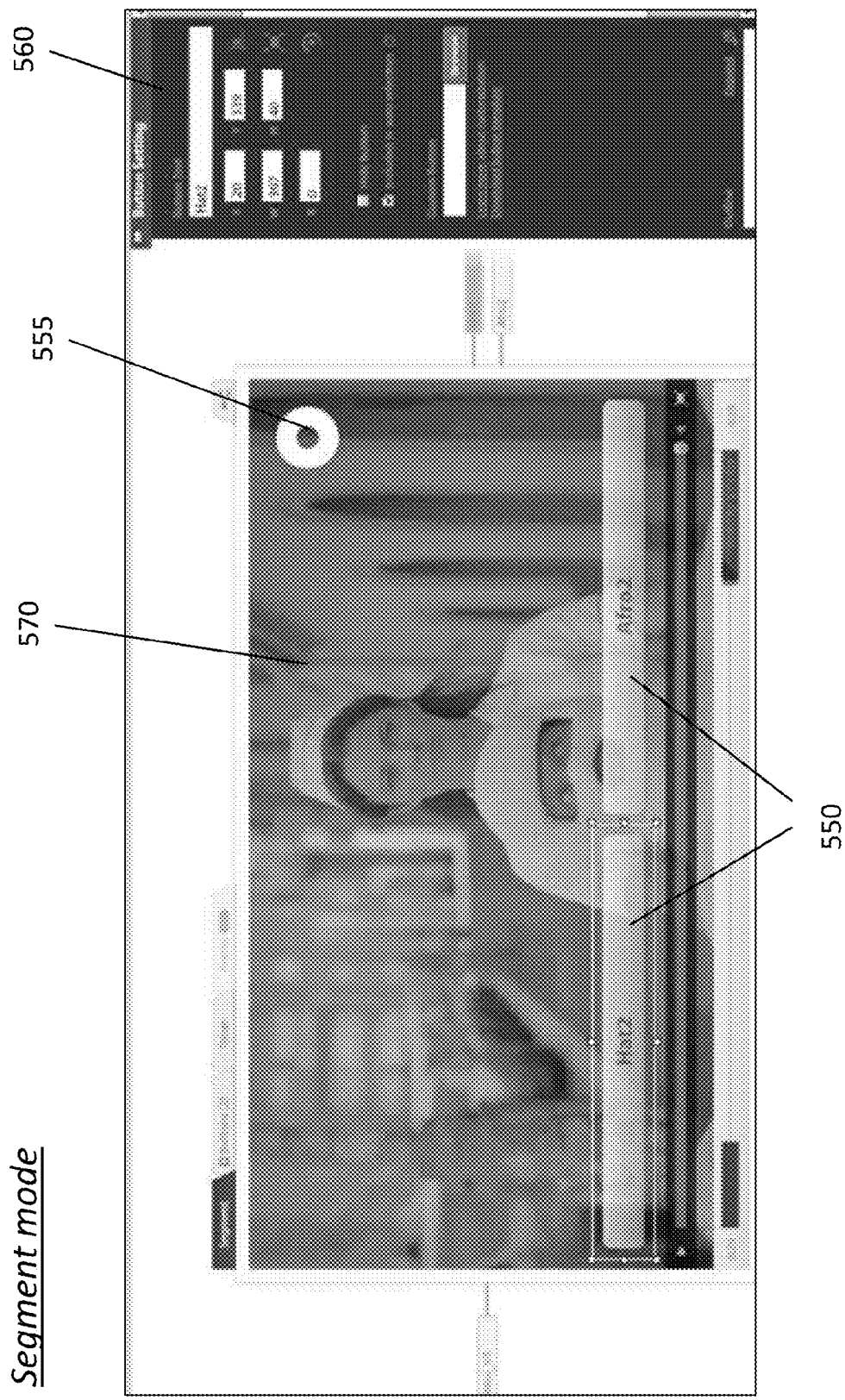
FIG. 5 is an exemplary user interface for modifying media content building block modules according to an embodiment of the invention.

The builder tool may also include Segment Mode, which focuses on an individual ISM and enables a user to edit the properties and content of that ISM. In segment mode, a user may add, delete, and preview audio, video, and/or other content associated with an ISM. The ISM may be named/renamed, and description and/or a script may be added/modified within the ISM. Referring to FIG. 5, a user may also edit the interactive layer of the ISM by, for example, adding, designing, and/or positioning button controls 550 and timers 555 over the video content 570. A properties panel 560 may allow the user to set various parameters for selected elements, and save/load the user's designs for each element. For example, as illustrated, the user may set the position, size and rotation of the button 550 using the properties panel 560. The panel 560 further provides settings for hiding the button or selecting whether it is to be included in the automatic selection of an option (e.g., when a viewer fails to select an option within a required period of time). Interactive element design may also include adding visual effects, such as visibility and/or fades, and adjusting the timings associated therewith. Other elements on the interactive layer other than selection buttons and timers may also be designed and modified using Segment Mode, and some or all elements may be exported for reuse and loaded into the same and/or other projects. The user may return to Project Mode by selecting a menu option, a tab, pressing a hotkey combination, and/or other similar operation.

Figure 6:
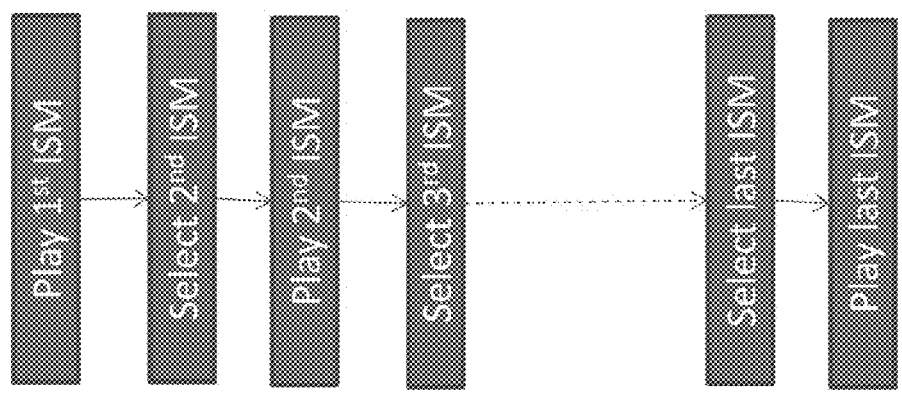
FIG. 6 is a flowchart depicting an exemplary playback path for media content block modules according to an embodiment of the invention.

In some embodiments, a specialized media player is used to interpret the content path structures into seamless, selectable video content for viewers. The player may seamlessly play any possible combination of ISMs created by the builder tool according to real-time segment selections made by a viewer or made automatically for the viewer. As illustrated in FIG. 6, the player seamlessly transitions through each ISM select until a final ISM is reached (i.e., an ISM with no outgoing connections).

Figure 7:
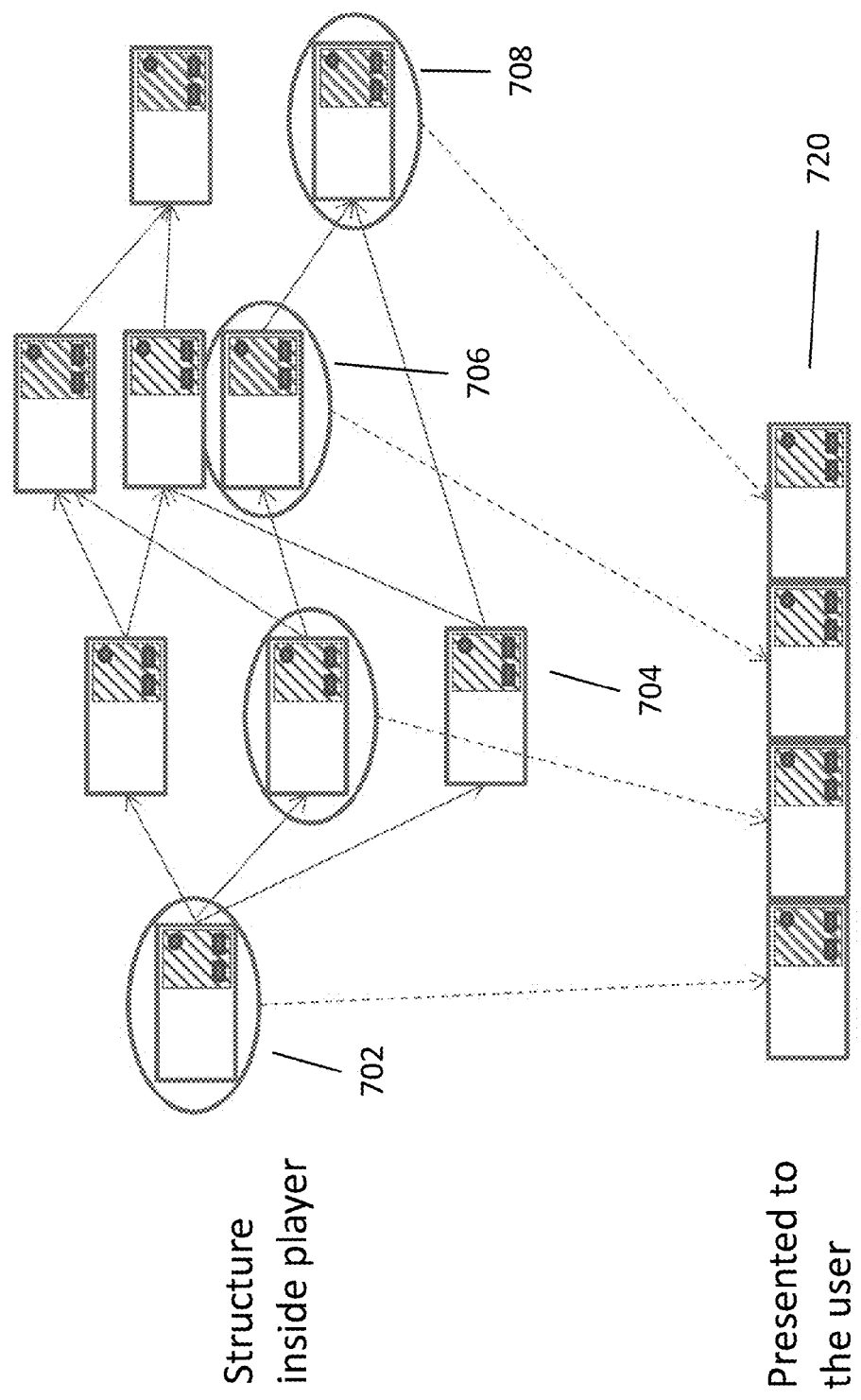
FIG. 7 is a diagram of a traversed media content path structure and corresponding media playback according to an embodiment of the invention.

The resulting video compiled in real-time by the player and based on the path structure appears to a viewer as one continuous video with no gaps or jumps. As shown in FIG. 7, a viewer may select video segments that cause the player to traverse the video content path including ISMs 702, 704, 706 and 708; however, the segments are seamlessly joined and presented to the user as a continuous video stream 720. The player may buffer each potentially viewable ISM prior to a connection point, allowing the seamless transition of both audio and video from the previous ISM played. In some embodiments, intelligent buffering of the video, audio, and/or other media content is performed as described in U.S. patent application Ser. No. 13/437,164, entitled "Systems and Methods for Loading More Than One Video Content at a Time," and filed Apr. 2, 2012, the entirety of which is hereby incorporated by reference.

One skilled in the art will recognize the various forms in which the systems and methods described herein may be implemented. For example, the invention may include a block definition module for facilitating user creation and modification of the ISMs. The block definition module may include various submodules such as a media assignment submodule for associating media content with ISMs, a layer submodule for modifying an interactive layer and associating it with an ISM, a statistics collector submodule for gathering statistics associated with the ISMs, and a configuration module for setting ISM properties. The invention may further include a builder module for assembling ISMs into media path structures, and a media player module for translating the media path structures into seamless media content upon the traversal of a path in the structure. These functions may be implemented in any appropriate hardware or software. If implemented as software, the invention may execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

The software may be implemented on such hardware as a smart or dumb terminal, network computer, personal digital assistant, wireless device, smartphone, game machine, music player, mobile telephone, laptop, palmtop, wireless telephone, information appliance, workstation, minicomputer, mainframe computer, or other computing device, that is operated as a general purpose computer or a special purpose hardware device that can execute the herein described functionality. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in a multi-platform language/framework such as Java, .Net, Objective C, or in native processor executable code. Illustratively, a programming language used may include assembly language, Ada, APL, Basic, C, C++, C#, Objective C, COBOL, dBase, Forth, FORTRAN, Java, Modula-2, Pascal, Prolog, REXX, and/or JavaScript, for example.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The system can include client and servers computers. A client and server are generally remote from each other and typically interact over a communication network. The relationship of client and server arises by virtue of computer programs running on the respective computers and having a client-server relationship to each other.

In various embodiments, the client computers include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the client automatically makes requests with the web browser. Examples of commercially available web browser software are Microsoft® Internet Explorer®, Mozilla® Firefox®, and Apple® Safari®.

In some embodiments, the client computers include client software. The client software provides functionality to the client that provides for the implementation and execution of the features described herein. The client software may be implemented in various forms, for example, it may be in the form of a web page, widget, and/or Java, JavaScript, .Net, Silverlight, Flash, and/or other applet or plug-in that is downloaded to the client and runs in conjunction with the web browser. The client software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software. The client software may also be in the form of a standalone application, implemented in a multi-platform language/framework as described above.

A communications network may connect the clients with the servers. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used In a client-server environment, the servers may be implemented on one or more server class computers that have sufficient memory, data storage, and processing power and that run a server class operating system (e.g., Oracle® Solaris®, GNU/Linux®, and the Microsoft® Windows® family of operating systems). Other types of system hardware and software than that described herein may also be used, depending on the capacity of the device and the number of users and the size of the user base.

Although internal components of the computer are not shown, those of ordinary skill in the art will appreciate that such components and the interconnections are well known. Accordingly, additional details concerning the internal construction of the computers need not be disclosed in connection with the present invention.

What is claimed is:

1. A system for constructing seamlessly viewable multimedia content from selectably presentable multimedia content blocks, the system comprising:
    a block definition module for facilitating creation and modification, by a user, of a plurality of selectably presentable multimedia content blocks, each content block comprising (i) multimedia content comprising a video stream and an audio stream and (ii) an interactive layer, the block definition module comprising:
        a media assignment submodule for associating a segment comprising synchronized audio and video with at least one of the content blocks;
        a block linking submodule for creating a traversable video tree by forming one or more seamless connections between the at least one content block and one or more other content blocks, wherein a transition between the audio and video streams of the connected blocks during playback of the video tree occurs substantially without interruption and;
        a layer submodule for associating an interactive layer with the at least one content block, the layer comprising controls for interacting with the multimedia content.

2. The system of claim 1, wherein the seamless connections comprise connections to one or more content blocks disposed prior to the at least one content block in respective content paths of the video tree.

3. The system of claim 1, wherein the seamless connections comprise connections to selectable next content blocks disposed subsequent to the at least one content block in respective content paths of the video tree, the selectable next content blocks comprising multimedia content optionally selectable for playback by a user during playback of the multimedia content of the at least one content block.

4. The system of claim 3, wherein the interactive layer of a particular content block comprises graphical option selection controls for selecting, by a user, one of the next content blocks to be seamlessly presented directly following playback of the multimedia content of the at least one content block.

5. The system of claim 4, wherein the interactive layer further comprises a graphical timer displaying a length of time remaining for a user to select one of the next content blocks to be seamlessly presented.

6. The system of claim 4, wherein the option selection controls are displayed during playback of a non-looping portion of the audio and video segment.

7. The system of claim 1, wherein the interactive layer is superimposed on and synchronized with playback of the video.

8. The system of claim 1, wherein the block definition module further comprises a statistics collector submodule for defining viewer actions to be tracked during playback of the video tree with respect to the at least one content block.

9. The system of claim 8, wherein the viewer actions comprise whether a viewer selects a next content block to be seamlessly presented directly following playback of the multimedia content of the at least one content block and which next content block, if any, is selected.

10. The system of claim 8, wherein the viewer actions comprise a length of time elapsed prior to a viewer selecting a next content block to be seamlessly presented directly following playback of the multimedia content of the at least one content block.

11. The system of claim 10, wherein the viewer actions comprise actions taken by the viewer using an input device during the length of time.

12. The system of claim 1, further comprising a builder module for facilitating assembly, by a user, of the content blocks into an interconnected structure, wherein the multimedia content of the blocks in each path of the interconnected structure is are seamlessly viewable via a content player.

13. The system of claim 12, wherein the interconnected structure comprises a node graph, wherein each content block is a node in the graph and is connected to at least one other content block, each connection representing a seamless viewing transition between the multimedia content of the connected blocks.

14. A method for constructing seamlessly viewable multimedia content from selectably presentable multimedia content blocks, the method comprising the steps of:
    facilitating creation and modification, by a user, of a plurality of selectably presentable multimedia content blocks, each content block comprising (i) multimedia content comprising a video stream and an audio stream and (ii) an interactive layer;
    associating a segment comprising synchronized audio and video with at least one of the content blocks;
    creating a traversable video tree by forming one or more seamless connections between the at least one content block and one or more other content blocks, wherein a transition between the audio and video streams of the connected blocks during playback of the video tree occurs substantially without interruption and;
    associating an interactive layer with the at least one content block, the layer comprising controls for interacting with the multimedia content.

15. The method of claim 14, wherein the seamless connections comprise connections to one or more content blocks disposed prior to the at least one content block in respective content paths of the video tree.

16. The method of claim 14, wherein the seamless connections comprise connections to selectable next content blocks disposed subsequent to the at least one content block in respective content paths of the video tree, the selectable next content blocks comprising multimedia content optionally selectable for playback by a user during playback of the multimedia content of the at least one content block.

17. The method of claim 16, wherein the interactive layer of a particular content block comprises graphical option selection controls for selecting, by a user, one of the next content blocks to be seamlessly presented directly following playback of the multimedia content of the at least one content block.

18. The method of claim 17, wherein the interactive layer further comprises a graphical timer displaying a length of time remaining for a user to select one of the next content blocks to be seamlessly presented.

19. The method of claim 17, wherein the option selection controls are displayed during playback of a non-looping portion of the audio and video segment.

20. The method of claim 14, wherein the interactive layer is superimposed on and synchronized with playback of the video.

21. The method of claim 14, further comprising defining viewer actions to be tracked during playback of the video tree with respect to the at least one content block.

22. The method of claim 21, wherein the viewer actions comprise whether a viewer selects a next content block to be seamlessly presented directly following playback of the multimedia content of the at least one content block and which next content block, if any, is selected.

23. The method of claim 21, wherein the viewer actions comprise a length of time elapsed prior to a viewer selecting a next content block to be seamlessly presented directly following playback of the multimedia content of the at least one content block.

24. The method of claim 23, wherein the viewer actions comprise actions taken by the viewer using an input device during the length of time.

25. The method of claim 14, further comprising facilitating assembly, by a user, of the content blocks into an interconnected structure, wherein the multimedia content of the blocks in each path of the interconnected structure is seamlessly viewable via a content player.

26. The method of claim 25, wherein the interconnected structure comprises a node graph, wherein each content block is a node in the graph and is connected to at least one other content block, each connection representing a seamless viewing transition between the multimedia content of the connected blocks.

\* \* \* \* \*

UNITED STATES PATENT AND TRADEMARK OFFICE
CERTIFICATE OF CORRECTION

| | |
|---|---|
| PATENT NO. | : 8,860,882 B2 |
| APPLICATION NO. | : 13/622780 |
| DATED | : October 14, 2014 |
| INVENTOR(S) | : Jonathan Bloch et al. |

It is certified that error appears in the above-identified patent and that said Letters Patent is hereby corrected as shown below:

In the Claims

In Claim 12, column 12, line 28, delete "are".

Signed and Sealed this
Tenth Day of March, 2015

Michelle K. Lee
*Deputy Director of the United States Patent and Trademark Office*